(12) United States Patent
Milot

(10) Patent No.: US 7,983,801 B2
(45) Date of Patent: Jul. 19, 2011

(54) VEHICLE STABILITY CONTROL UTILIZING STATIC TIRE DATA

(75) Inventor: Danny R. Milot, Ann Arbor, MI (US)

(73) Assignee: Kelsey-Hayes Company, Livonia, MI (US)

( * ) Notice: Subject to any disclaimer, the term of this patent is extended or adjusted under 35 U.S.C. 154(b) by 216 days.

(21) Appl. No.: 11/359,685

(22) Filed: Feb. 22, 2006

(65) Prior Publication Data

US 2006/0190150 A1   Aug. 24, 2006

Related U.S. Application Data

(60) Provisional application No. 60/655,047, filed on Feb. 22, 2005.

(51) Int. Cl.
*B60T 8/175* (2006.01)

(52) U.S. Cl. .................. 701/1; 701/29; 701/36; 701/37; 701/41; 701/45; 701/48; 701/51; 701/54; 701/69; 701/70; 701/72; 701/78; 701/82; 340/438; 340/441; 340/442; 340/443; 340/448; 303/146

(58) Field of Classification Search ........... 116/340–349
See application file for complete search history.

(56) References Cited

U.S. PATENT DOCUMENTS

| | | | |
|---|---|---|---|
| 5,181,975 A | 1/1993 | Pollack et al. | |
| 5,218,861 A | 6/1993 | Brown et al. | |
| 5,731,754 A * | 3/1998 | Lee et al. | 340/447 |
| 5,749,984 A * | 5/1998 | Frey et al. | 152/415 |
| 5,760,682 A | 6/1998 | Liu et al. | |
| 5,764,138 A * | 6/1998 | Lowe | 340/447 |
| 5,931,880 A | 8/1999 | Brachert | |
| 5,954,407 A | 9/1999 | Schramm et al. | |
| 5,977,870 A * | 11/1999 | Rensel et al. | 340/447 |
| 6,591,671 B2 * | 7/2003 | Brown | 73/146.5 |
| 7,015,802 B2 * | 3/2006 | Forster | 340/445 |
| 7,091,840 B2 * | 8/2006 | Ichinose | 340/447 |
| 7,104,438 B2 * | 9/2006 | Benedict | 235/375 |
| 7,213,451 B2 * | 5/2007 | Zhu et al. | 73/146 |
| 2002/0126005 A1 * | 9/2002 | Hardman et al. | 340/442 |
| 2003/0030553 A1 | 2/2003 | Schofield et al. | |
| 2003/0048178 A1 | 3/2003 | Bonardi et al. | |
| 2003/0058118 A1 | 3/2003 | Wilson | |
| 2003/0080860 A1 | 5/2003 | Stewart et al. | |

(Continued)

FOREIGN PATENT DOCUMENTS

DE   196 51 968 A1   6/1998

(Continued)

OTHER PUBLICATIONS

Z. Bareket, D.F. Blower & C. MacAdam, "Blowout Resistant Tire Study for Commercial Highway Vehicles", UMTRI-2000-28, The University of Michigan Transportation Research Institute, Ann Arbor, Michigan, Aug. 31, 2000.

(Continued)

*Primary Examiner* — Jack Keith
*Assistant Examiner* — Jonathan M Dager
(74) *Attorney, Agent, or Firm* — MacMillan, Sobanski & Todd, LLC

(57) ABSTRACT

A system for and a method of controlling the stability of a vehicle includes an electronic control system controlling a vehicle stability control subsystem based at least in part on static tire data received by the electronic control unit.

9 Claims, 2 Drawing Sheets

U.S. PATENT DOCUMENTS

| | | |
|---|---|---|
| 2003/0080862 A1 | 5/2003 | Kranz |
| 2003/0102966 A1 | 6/2003 | Konchin et al. |
| 2003/0112138 A1 | 6/2003 | Marguet et al. |
| 2003/0117015 A1* | 6/2003 | Kuwajima et al. ............ 303/150 |
| 2003/0117277 A1 | 6/2003 | Marguet et al. |
| 2003/0122661 A1* | 7/2003 | Ginman et al. ............... 340/447 |
| 2003/0144785 A1 | 7/2003 | Brachert et al. |
| 2003/0149542 A1* | 8/2003 | Chang ........................... 702/145 |
| 2003/0201044 A1* | 10/2003 | Schick ........................ 152/152.1 |
| 2003/0227379 A1* | 12/2003 | Itou ............................... 340/442 |
| 2004/0017291 A1* | 1/2004 | Hardman et al. ............. 340/505 |
| 2004/0024562 A1* | 2/2004 | Barron et al. ................. 702/142 |
| 2004/0124995 A1 | 7/2004 | Treutler et al. |
| 2004/0128044 A1* | 7/2004 | Hac ................................. 701/48 |
| 2004/0164140 A1* | 8/2004 | Voeller et al. ................. 235/375 |
| 2004/0172180 A1* | 9/2004 | Bowman .......................... 701/29 |
| 2004/0220715 A1 | 11/2004 | Kingston |
| 2004/0225423 A1* | 11/2004 | Carlson et al. .................. 701/36 |
| 2005/0027402 A1* | 2/2005 | Koibuchi et al. .................. 701/1 |
| 2005/0073435 A1* | 4/2005 | Voeller et al. ................. 340/933 |
| 2005/0075825 A1* | 4/2005 | Zheng et al. .................. 702/140 |
| 2005/0080546 A1* | 4/2005 | Milot ............................... 701/70 |
| 2005/0081616 A1* | 4/2005 | Suzuki et al. .................... 73/146 |
| 2005/0093688 A1* | 5/2005 | Sinnett et al. ................. 340/447 |
| 2005/0102086 A1* | 5/2005 | Nakao ............................. 701/80 |
| 2005/0273289 A1* | 12/2005 | Thiesen ........................ 702/104 |
| 2006/0069489 A1* | 3/2006 | Chen et al. ....................... 701/70 |
| 2006/0090558 A1* | 5/2006 | Raskas ............................. 73/146 |
| 2006/0106561 A1* | 5/2006 | Thiesen ........................ 702/104 |
| 2008/0001728 A1* | 1/2008 | Dufournier ................... 340/444 |

FOREIGN PATENT DOCUMENTS

| | | |
|---|---|---|
| EP | 1 459 911 A1 | 9/2004 |
| WO | WO 3093081 A1 * | 11/2003 |
| WO | WO 2004/101336 A1 | 11/2004 |

OTHER PUBLICATIONS

English Language Abstract of DE 196 51 968 A1, Publication Date is Jun. 18, 1998.

* cited by examiner

VEHICLE STABILITY CONTROL UTILIZING STATIC TIRE DATA

CROSS-REFERENCE TO RELATED APPLICATIONS

This application claims the benefit of U.S. Provisional Application No. 60/655,047, filed Feb. 22, 2005, the disclosures of which are incorporated herein by reference.

BACKGROUND OF THE INVENTION

This invention relates in general to electronic stability control systems and more particularly to improving the performance of electronic stability control systems with the use of static tire parameters.

All vehicle tires are not alike. They come in many different diameters, widths, and profiles. They have variations in construction, such as the use of aramid fiber or steel reinforcement belts, different sidewall thicknesses, and so forth that cause different tires to respond differently when a load is imposed on the tire. Vehicle performance is affected by the type of tires that are put on a vehicle. To ensure that a tire of the proper construction and performance for the vehicle is installed, it is known to put identifying markings on a tire. For example, a tire may be provided with a marking like "P215/65 R15 89H". The "P" indicates that the tire is for a passenger car. The "215" indicates the tire width in millimeters from sidewall to sidewall. The "65" indicates the aspect ratio of the tire sidewall measurement to the tire height; therefore "65" indicates the ratio equals 65%. The "R" indicates the type of tire construction; in this case, the tire is a Radial tire. The "15" indicates the wheel diameter or the measurement of the wheel's rim. This tire is adapted to fit on a 15 inch rim. The "89H" indicates a load index and speed rating. Thus, "89H" represents the load index minus the amount of weight the tire can safely carry when properly inflated. "H" is the speed rating. "H" indicates that the tire is rated for speeds up to 130 MPH (miles per hour). Other examples of speed ratings are: Q=100 MPH, S=112 MPH, U=124 MPH, H=130 MPH, Z=149 MPH and higher. Other information on a tire is the tire construction, the Uniform Tire Quality Grading (UTQG), and the maximum cold inflation pressure and load.

Additionally, it has been proposed by one manufacturer to provide each tire with a Radio Frequency Identification (RFID) tag for tire tracking in compliance with the United States Transportation, Recall, Enhancement, Accountability and Documentation Act (TREAD Act). RFID is an electronic identification method in which data is stored, and can be remotely retrieved from devices called RFID tags or transponders. An RFID tag can be attached to or incorporated into a product or even an animal. RFID tags contain silicon chips and antennas to enable them to receive and respond to radio-frequency queries from an RFID transceiver. Passive tags require no internal power source, whereas active tags require a power source.

Using RFID tag on tires for the purposes of identifying and tracking the tires during manufacture, and distribution for the purposes of the TREAD Act would involve communication with the RFID while the tire is at rest to obtain data identifying the particular tire.

As previously indicated, not all tires are alike. When purchasing a vehicle, a customer typically has a choice of wheels and associated tires which can be ordered with a vehicle, with each different choice typically having some consequence in the handling of a vehicle. For example, in a Sport Utility Vehicle (SUV) tires with a fairly large difference in diameter are available to the purchaser. One purchaser may choose large diameter tires for improved ground clearance when driving off road. Another purchaser may choose tires with a smaller diameter, resulting in a lower center of gravity and better stability for the vehicle.

Various electronic stability control systems are known which utilize information from various sensors that measure dynamic characteristics of the movement of a vehicle, such as acceleration, yaw rate, pitch rate, roll rate, steering angle, vehicle braking action, vehicle drive train operation, etc., to control operation of various components of the vehicle, to improve handling. Examples of components which may be controlled by the electronic stability control system are actuators coupled to the vehicle suspension system, the engine/powertrain, steering actuators, and the vehicle brakes. These systems have typically been designed in the past around a nominal tire design, and the manufacturer will specify the use of certain tires having performance within certain limits of the nominal tire design, so that the stability of the vehicle will lie within accepted norms, regardless of which of the factory specified option tires are chosen by a consumer.

SUMMARY OF THE INVENTION

This invention relates to an improved electronic stability control system which utilizes information from various sensors measuring dynamic characteristics of the movement of a vehicle, such as acceleration, yaw rate, pitch rate, roll rate, steering angle, vehicle braking action, vehicle drive train operation, etc., to control operation of various components of the vehicle, to improve handling. Examples of components which may be controlled by the electronic stability control system are actuators coupled to the vehicle suspension system, the engine/powertrain, steering actuators, and the vehicle brakes. According to one embodiment of the invention, data about certain static characteristics of a tire, such as static tire rolling radius and cornering stiffness, is encoded into a data tag which is associated with the tire. In one embodiment, this data is transmitted through a transceiver to an electronic control unit, where this data is utilized to modify the response of the electronic stability control system in controlling the operation of the various components of the vehicle, resulting in further improved handling. Thus, the electronic stability control system is designed to adapt the stability control operation to the specific tires that are installed on the vehicle, and not control just based on a nominal tire design as has been done in the past. Furthermore, even when a customer purchases tires other than those specified by the manufacturer, from the wide range of tires available on the aftermarket, if the tires are provided with a data tag for use with the transceiver, the electronic stability control system can adapt it's control of the vehicle components to provide improved stability (compared to operation of the vehicle with the same tires without this adaptation of control) once the data from the data tag has been transmitted to the electronic control unit of the electronic stability control system.

Various objects and advantages of this invention will become apparent to those skilled in the art from the following detailed description of the preferred embodiment, when read in light of the accompanying drawings.

DETAILED DESCRIPTION OF THE PREFERRED EMBODIMENTS

Figure 1:
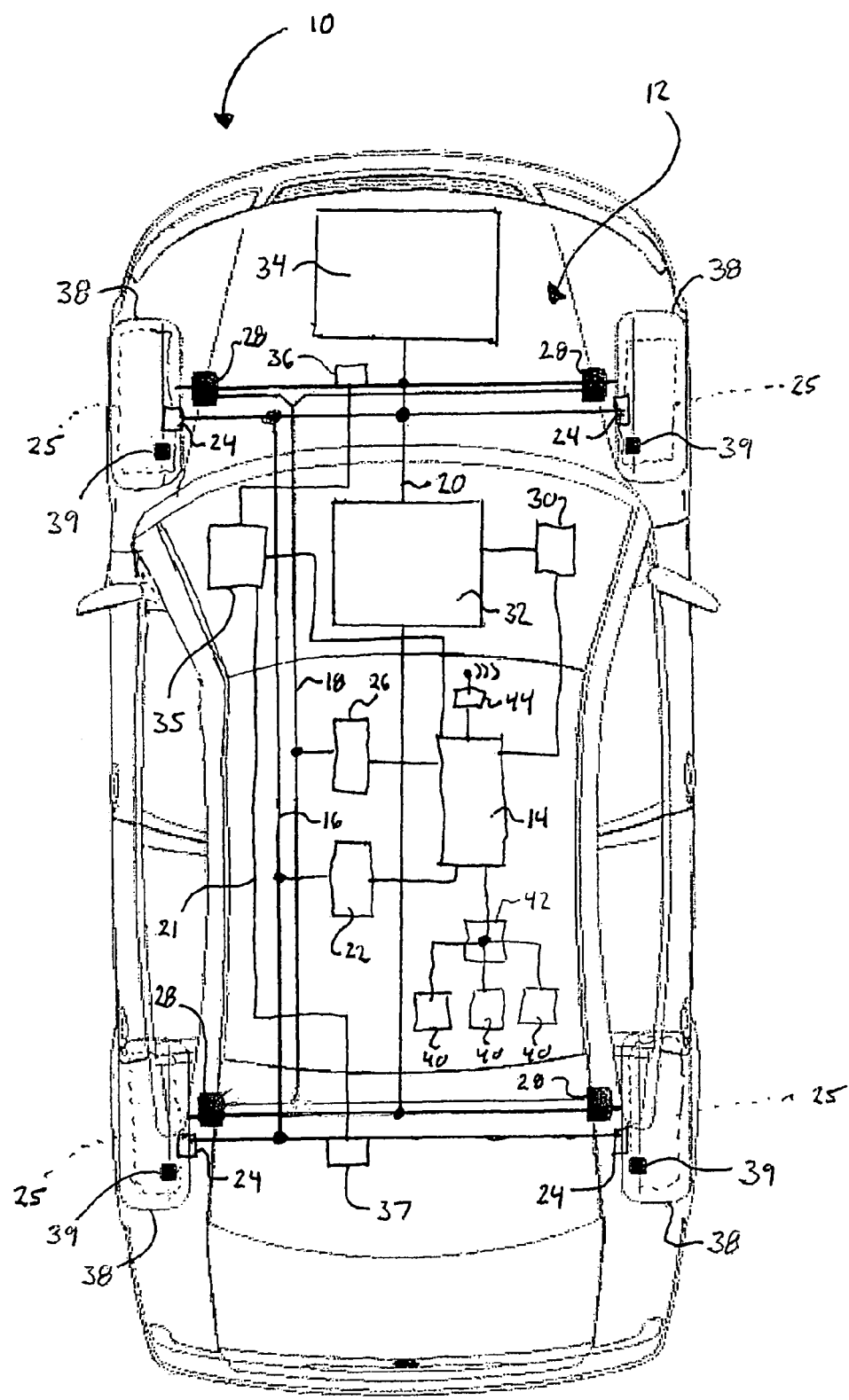
FIG. 1 is a schematic diagram of a vehicle having an electronic stability control system according to one embodiment of the invention.

Referring now to the drawings, there is illustrated in FIG. 1 a vehicle 10 having an electronic stability control system 12. The electronic stability control system 12 includes an electronic control unit 14. The electronic stability control system 12 also includes a plurality of vehicle stability control subsystems. The plurality of vehicle stability control subsystem includes components of the vehicle that affect stability of the vehicle during operation. As shown in FIG. 1 the plurality of vehicle stability control subsystems includes a vehicle braking system 16, a vehicle suspension system 18, a vehicle powertrain system 20, and a vehicle steering system 21. It must be understood, however, that the plurality of vehicle stability control subsystems need not include any particular vehicle system and indeed may be any suitable vehicle system for controlling the stability of a vehicle. The individual vehicle systems to be included in the plurality of vehicle stability control subsystems may, for example, be chosen based upon the application of a particular vehicle 10 in which the electronic stability control system 12 is to be included.

The vehicle braking system 16 includes an electronic brake controller 22 and a plurality of wheel brakes 24 for braking associated wheels 25 of the vehicle 10.

The vehicle suspension system 18 includes an electronic suspension controller 26 and a plurality of suspension actuators 28 for isolating portions of vehicle 10 from loads imposed by irregularities in the terrain over which the vehicle 10 travels or imposed by the movements of other portions of the vehicle 10. The condition of some component of the vehicle suspension system is modified so as to improve stability of the vehicle, including roll bar or other suspension actuators 28, operation of valves or other components to change fluid flow characteristics in such items as shock absorbers, varying the air pressure in pneumatic suspension bags, changing the electrical field supplied to suspension components containing electro-rheological fluids, or even varying air pressure in vehicle tires.

The vehicle powertrain system 20 includes a transmission controller 30 and a power transmission unit 32 connected to an engine 34 of the vehicle 10. The power transmission unit 32 transfers power to and distributes power among the wheels 25 of the vehicle 10.

The vehicle steering system 21 includes a steering controller 35 for controlling a front steering actuator 36 and a rear steering actuator 37. The front steering actuator 36 controls the angle of the front wheels 25 relative to the main portion of the vehicle 10 and the rear steering actuator 37 controls the angle of the rear wheels 25 relative to the main portion of the vehicle 10.

The electronic control unit 14 of the electronic stability control system 12 generates one or more output signals to one or more vehicle stability control subsystems in order to cause the vehicle stability control subsystem(s) to act to improve vehicle stability.

A respective tire 38 having an ID tag 39 is mounted upon each wheel 25. The ID tags 39 containing data about static characteristics of a respective tire 38. For example, the data contained in the ID tags 39 may include a manufacturer's identification number, a manufacturer's model number, a manufacturer's serial number, a static rolling radius, a tire size, an associated vehicle type, a sidewall to sidewall width, an aspect ratio, a type of construction, an associated wheel diameter, a load index, a speed rating, a cornering stiffness, a wheel inertia property, or any other information about the static characteristics of a respective tire 38. Preferably, the ID tag 39 is an RFID tag and may be either an active or a passive RFID tag.

The electronic control unit 14 is coupled in communication with the ID tags 39 to receive the static tire data. The electronic control unit 14 is programmed to control the plurality of vehicle stability control subsystems based at least in part upon the static tire data received by the electronic control unit 14 from the ID tags 39.

The electronic stability control system 12 includes a plurality of sensors 40 configured to detect a variety of vehicle conditions. For example, the sensors 40 may detect steering wheel angle, vehicle yaw rate, vehicle speed, speed of individual wheels, vehicle lateral acceleration, and vehicle longitudinal acceleration. Even the position of obstacles in the road or the position of other vehicles may be detected through such advanced sensors 40 as vehicle radar (it may be desirable to modify control of vehicle stability control subsystem based on, for example, anticipated need to maneuver the vehicle to avoid such obstacles or other vehicles).

The electronic control unit 14 is coupled in communication with the plurality of sensors 40 to receive the data representative of the vehicle condition detected by a particular sensor 40. The electronic control unit 14 is programmed to control the plurality of vehicle stability control subsystems based at least in part upon the vehicle condition data received by the electronic control unit 14 from the plurality of sensors 40.

The electronic stability control system 12 optionally includes a mechanism 42, e.g., a relay, to receive the vehicle condition data from one or more of the sensors 40 and re-transmit the vehicle condition data to the electronic control unit 14. For example, the mechanism 42 may be a hard-wired data relay, a wireless data transceiver, or any other suitable device for communicating the vehicle condition data from the sensors 40 to the electronic control unit 14. Alternatively, the sensors 40 and the electronic control unit 14 may be in direct (wired or wireless) communication.

Optionally, the electronic stability control system 12 may includes a second mechanism 44, e.g., a relay, to receive the static tire data from one or more of the ID tags 39 and re-transmit the static tire data to the electronic control unit 14. For example, the mechanism 42 may be a hard-wired data relay, a wireless data transceiver, or any other suitable device for communicating the static tire data from the ID tags 39 to the electronic control unit 14. Alternatively, the ID tags 39 and the electronic control unit 14 may be in direct communication.

Figure 2:
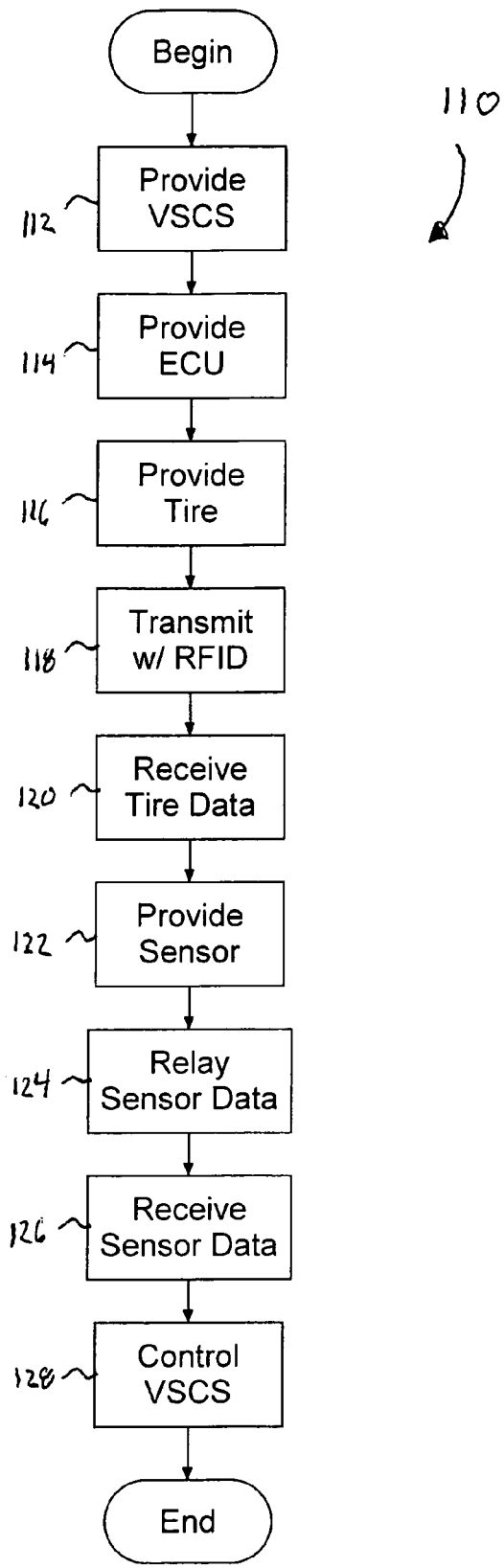
FIG. 2 is a flow chart illustrating a method of controlling the stability of a vehicle according to another embodiment of the present invention.

There is shown in FIG. 2 a flow chart illustrating a method 110 of controlling the stability of a vehicle. For example, the method 110 may utilize the electronic stability control system 12 to control the vehicle 10 shown in FIG. 1.

The method 110 begins in functional block 112 where a vehicle stability control subsystem including components of the vehicle that affect stability of the vehicle during operation is provided and installed on the vehicle. For example, the vehicle stability control subsystem may be a braking system, powertrain system, suspension system, steering system, or any other vehicle system operable to control the stability of the vehicle.

The method 110 then proceeds to functional block 114 where an electronic control unit for controlling the vehicle stability control subsystem is provided and installed on the vehicle.

The method 110 then proceeds to functional block 116 where a tire having an ID tag containing data about at least one static characteristic of the tire is provided and mounted on the vehicle.

The method 110 then proceeds to functional block 118 where the static tire data with the ID tag is transmitted. Preferably, the ID tag is an RFID tag and the data is transferred by radio communications in the range of 30-300 kHz.

The method 110 then proceeds to functional block 120 where the static tire data is received by the electronic control unit. For example, the static tire data may be a manufacturer's identification number, a manufacturer's model number, a manufacturer's serial number, a static rolling radius, a tire size, an associated vehicle type, a sidewall to sidewall width, an aspect ratio, a type of construction, an associated wheel diameter, a load index, a speed rating, a cornering stiffness, a wheel inertia property, or any other suitable static characteristic of a tire.

The method 110 then proceeds to functional block 122 where at least one sensor configured to detect at least one vehicle condition is provided and installed on the vehicle. For example, the vehicle condition detected may be one of steering wheel angle, vehicle yaw rate, vehicle speed, speed of individual wheels, vehicle lateral acceleration, vehicle longitudinal acceleration, or any other suitable vehicle condition.

The method 110 then proceeds to functional block 124 where the sensor data is relayed to the electronic control unit from the sensor.

The method 110 then proceeds to functional block 126 where the sensor data representative of the vehicle condition detected by the sensor is received by the electronic control unit.

The method 110 then concludes in functional block 128 where the vehicle stability subsystem is controlled with the electronic control unit based at least in part upon the static tire data received with the electronic control unit from the ID tag. More particularly, the electronic control unit modifies it's response to the data received from the sensors based on the static tire data received from the ID tag, so that the control signals sent to the vehicle stability subsystems by the electronic control unit (responsive to the sensor data received from the sensors) differ depending upon the type of tire installed on the vehicle.

Preferably, least one of the torque of a powertrain of the vehicle, the apply force of a braking component of the vehicle, the steering angle controlled by steering actuators, or the condition of some component of the vehicle suspension system is modified so as to improve stability of the vehicle. For example, the electronic control unit may control the vehicle stability control subsystem by generating an output signal to which the vehicle stability control subsystem is responsive.

Some further examples of static tire data include tire stiffness as it relates to cornering, vertical forces, lateral forces, or fore-aft forces. Tire sensitivities are also included in the static tire data category. Tire sensitivities are changes in the above listed tire capabilities and stiffness due to pressure, temperature and tire wear. This information can be used with other sensed data, described above and further below, to update tire response models, in vehicle stability control programming, that affect the tire, and thus the vehicle, performance.

As discussed above, one embodiment of the present invention includes a method of obtaining tire information through the use of radio frequency identification (RFID). Tires have a flexible body, move at high rotation rates, move according to vehicle suspension movement, and are affected by shock and vibration. An RFID tag to be used in a tire should be configured to account for these environmental conditions. An RFID tag should be shielded from wheel and tire metal reinforcements to avoid interference or ghosting of an RF signal. Additionally, the RFID tag may be configured to endure the harsh environment including snow, rain, mud, and salt, as well as temperature extremes, to which tires are subjected.

As discussed above, another aspect of a preferred embodiment of the invention relates to static tire information delivery to the vehicle or vehicle component. To preserve data integrity, an identification tag is preferably permanently attached to the tire. To maintain data currency a controller unit, such as the electronic control unit or the static tire data relay, may periodically query the ID tag, such as each time when the vehicle is keyed on. Since the tire is a rotating body, i.e., not conducive to wired connection, it is preferred that there is radio frequency link to transmit the data, such as used with the RFID tag system. In one embodiment, the RFID tag may be an active or self-powered ID tag. To power the ID tag and other communication equipment, the system can implement a battery. However, in a preferred embodiment, the system passively draws power from the vehicle, such as through RF power transfer and magnetic/electric induction. In one embodiment, the static tire data system includes a tire mounted circular antenna and one or more vehicle mounted readers. In this embodiment, the data is transmitted using a worldwide low frequency (LF) transmission system within a range of about 30 to 300 kHz. In this case, the preferred frequency is approximately 125 kHz. This should provide a reliable communication system for the static tire data and be a reliable current delivery system for a passive RFID. Similarly, it is expected that such a wireless communication system may be used with at least some of the sensors systems.

As discussed above, an electronic stability control (ESC) system utilizes static tire data, as well as optionally other vehicle condition information, to provide improved vehicle stability control. Again, examples of these vehicle conditions may include, but are not limited to: steering wheel angle, tire pressure, tire temperature, yaw rate, vehicle speed, lateral cornering stiffness, wheel inertia properties, and dynamic tire size, as well as any other criteria that could be used to more accurately measure and adjust vehicle stability control.

The following is an example of a steering maneuver in which a vehicle including a stability control system according to one embodiment of the present invention may utilize the stability control system to improve vehicle stability during the maneuver. The system may initially monitor vehicle conditions, such as steering wheel angle, to determine the intent of the driver prior to beginning a steering maneuver. The sensors of the system may specifically detect vehicle yaw rate and lateral acceleration to assess the dynamic behavior of the vehicle. The stability system may then actuate a wheel torque, via the braking system and/or powertrain drive torque control to modulate the vehicle yaw moment. Increased vehicle yaw stability (i.e., limited sideslip angle) reduces the potential for the vehicle to leave the road and reduce the likelihood that the vehicle will roll over. As the vehicle approaches an obstacle, the driver may rapidly changes direction causing a yaw moment to build up. As the driver turns back, for example into an adjacent lane (e.g., the original lane), such action leads to yaw moment reversal. During this maneuver, rear wheels can lose traction causing a yaw moment overshoot. This can cause the tires to lose adhesion and oversteer would be induced.

A preferred embodiment of the present invention provides for improved vehicle performance, e.g., improved stability control, during a vehicle maneuver such as described above. To improve the vehicle performance, one embodiment of the present invention contemplates vehicle dynamic equations that implement static tire data information to modify the stability control programming based on specific vehicle/tire characteristics. As discussed in the background, some vehicles are able to operate on tires having different sizes (typically each of the tires on a particular vehicle is the same, but otherwise identical vehicles could have differently sized tires). For example, a sports utility vehicle (SUV) has the potential for significant tire variation in terms of size and characteristics (e.g., typically from 16 inches to 22 inches and sometimes up to 26 inches). A vehicle performs differently when equipped with one set tires as compared to when equipped with another set of tires with different characteristics. A conventional stability control system can not always operate optimally between different sets of tires as the conventional system is programmed with fixed set of tire characteristic values, typically chosen based on manufacturer original equipment specifications. Conventional stability control systems can not identity changes in tire characteristics and adjust to variations in different tires. In one embodiment of the present invention, the stability control system automatically calibrates and adjusts based on changes in tire characteristics. To alleviate loss of adhesion and oversteer, corrective action may be applied using one or more vehicle stability control subsystem to counteract yaw moment overshoot and/or to correct the oversteer. The timing and the magnitude of the corrective actions required, even the type of corrective action required, to alleviate the loss of adhesion and the oversteer of the vehicle with one set of tires (such as tall, relatively narrow tires) will be different than the timing, magnitude, or type of corrective action required for the same vehicle in the same maneuver with a different set of tires (such as short, relatively wide tires). According to a preferred embodiment of the invention, the electronic control unit is programmed to modify the timing, magnitude or type of corrective action to suit the static characteristics of the tires mounted on the vehicle, according to the data supplied by the ID tag, to best alleviate the loss of adhesion and oversteer. Examples of corrective action which could be taken is stiffening suspension components, applying laterally differential braking, automatically reducing engine (powertrain/drivetrain) torque at an earlier moment in the maneuver, adjusting steering angle, etc.

In one embodiment of the present invention, static tire data from an RFID tag is integrated by an electronic control unit with dynamic vehicle characteristics, such as a wheel speed, a vehicle speed, a linearized yaw rate, and a sideslip rate. It must be understood that the values of the vehicle characteristics may be estimated or modeled by the programming in the electronic control unit 14 of the electronic stability control system 12, or in any other suitable vehicle unit. That is to say that the electronic control unit 14 may be a dedicated, separate electronics module, may be closely networked with other electronic control units, or may be implemented as a subfunction of an electronic control unit such as a brake system electronic control unit or an engine electronic control unit.

Further, in one aspect, the present invention preferably includes an impact analysis to control stability control activation, and an impact analysis to vehicle sideslip estimation. An analysis of the vehicle speed estimation is preferably a function of four wheel speed measurements. For example, a frequency based measurement maybe taken to obtain the rotational speed of each individual wheel. One analysis, including the frequency to rotational speed and a conversion to linear speed, requires the rolling radius ($R_{wf}$, $R_{wr}$). The variable $R_{wf}$ represents the dynamic front tire radius and the variable $R_{wr}$ represents the dynamic rear tire radius. The dynamic tire rolling radius may be adapted from a nominal static value of the tire rolling radius. The dynamic rolling radius is preferably within a specific range to be acceptable for adaptation. The static tire rolling radius is a key parameter for enabling the adaptation of the stability control response when there are significant tire size changes. The following equations (Eq1), (Eq2) and (Eq3) are equations that may be programmed into the electronic control unit, or other suitable vehicle component, to calculate an individual wheel speed or a vehicle speed. In the following equations WS is a wheel speed in rev/ms where rev is revolutions, ms is milliseconds, th is the number of teeth on a tone wheel, and lp is the number of processing loops. $WS_1$ is the wheel speed in m/s where m is meters, s is seconds, and R is the static rolling radius of the tire associated with the wheel in meters. V is the vehicle speed where $\Sigma WS_1$ is the sum of the wheel speeds for one or more wheels of the vehicle and WN is the total number of wheels whose speeds are summed.

$$WS = \text{rev}/th \times th/lp \times lp/\text{ms} = \text{rev/ms} \qquad (Eq1)$$

$$WS_1 = \text{rev/ms} \times 1000 \text{ ms/s} \times 2\pi R = \text{m/s} \qquad (Eq2)$$

$$V = \Sigma WS_1/WN \qquad (Eq3)$$

The computed wheel speed and thus the computed vehicle speed will vary in relation to the valve used for the static tire rolling radius. In the present embodiment, the electronic control unit of the stability control system obtains a value for the static tire rolling radius from an ID tag of each tire installed on the vehicle, thus using updated static tire data to enable an improved calculation of wheel speed and or vehicle speed and in turn provide improved vehicle stability control.

While the Equations above (Eq1), (Eq2), and (Eq3) have been described as utilizing the tooth count of a tone wheel to derive the revolution speed of a particular wheel, it must be understood, however, that the revolution speed may be derived in any suitable manner, such as by an equation (not shown) utilizing pulse edge detection of a dynamic accelerometer located in the tire, or may other suitable mechanism.

One embodiment of the present invention preferably includes integrating tire data from an RFID tag with the programming in an electronic control unit in a stability control system, and includes analysis of the vehicle yaw rate to modify the stability control. The control necessary to maintain a particular yaw rate of the vehicle may be calculated based upon inputs of data representing dynamic vehicle conditions, including the vehicle speed (V) and steering wheel angle ($\delta$). These dynamic data inputs may be used to maintain a desired yaw rate.

In one embodiment of the present invention, the programming in the electronic control unit preferably includes a model developed from a linear bicycle model. As is understood in the art, the bicycle model is a modeling technique wherein a four-wheeled vehicle is modeled as a two-wheeled vehicle.

The following equation (Eq4) is equations that may be programmed into the electronic control unit, or other suitable vehicle component, to calculate a vehicle yaw rate. In the following equation R_lin is a vehicle yaw rate where V is a vehicle speed, such as calculated from the equations (Eq1), (Eq2) and (Eq3) above, L is the distance between the front and rear tires (wheel base), $V_{char}$ is a value of vehicle characteristic calculated from values of normal load and tire cornering stiffness, and $\delta$ is a vehicle steering angle.

$$R\_lin = \frac{V}{L \cdot \left(1 + \frac{V^2}{V_{char}^2}\right)} \delta \quad \text{(Eq 4)}$$

The yaw rate will vary in relation to the valve used for the static tire cornering stiffness. In the present embodiment, the electronic control unit of the stability control system obtains a value for the static tire cornering stiffness from an ID tag of each particular tire, thus using updated static tire data to enable an improved calculation of yaw rate and in turn provide improved vehicle stability control.

In a preferred embodiment of the present invention, integrating tire data from an RFID tag with the programming in an electronic control unit of a stability system is accomplished using an analysis of the vehicle sideslip estimation. Such an estimation is a dynamic Beta estimation using differential equations derived from the linear bicycle equations. $\dot{\beta}$ is a rate of change of sideslip. $\beta$ is a value of sideslip. Dynamic data inputs of vehicle characteristics into the equations may include the tire steering angle ($\delta$) such as the steering angle used in equation (Eq4) above, vehicle speed (V) such as is calculated from the equations (Eq1), (Eq2) and (Eq3) above, and the yaw rate (r) such as is calculated from the equation (Eq4) above. Some vehicle parameters used with the equations may include total vehicle mass (M), cornering stiffness-front tire ($C_{af}$), cornering stiffness-rear ($C_{ar}$), distance between the front axle to the center of gravity (a), and distance between the rear axle to the center of gravity (b). The calculation of the sideslip expectation for the stability control law in the electronic control unit programming is preferably such a Beta estimation.

$$\dot{\beta} = \left(\frac{C_{af} + C_{ar}}{MV}\right) \cdot \beta + \left(\frac{aC_{af} - bC_{ar} - mV^2}{MV^2}\right) \cdot r + \left(\frac{-C_{af}}{MV}\right) \cdot \delta \quad \text{(Eq 5)}$$

As may be seen from the equation (Eq5), the sideslip of a vehicle depends in part on the value used for the static tire cornering stiffness. In the present embodiment, the electronic control unit of the stability control system obtains a value for the static tire cornering stiffness from an ID tag of each tire installed on the vehicle, thus using updated static tire data to enable an improved calculation of sideslip and in turn provide improved vehicle stability control.

In summary, the implementation of the above described estimations into a stability control system includes certain modifications of operation, relative to a conventional stability control system. One example of such a modification is to implement the rolling radius parameter as a control variable in the electronic control unit. The rolling radius parameter may be used in the vehicle speed estimation correction. Another example of such a modification is to implement the yaw rate model for activation parameter. This parameter may uses the variable, $V_{char}$, which represents the characteristic speed of the vehicle based on nominal lateral characteristics. The yaw rate model may be used to enhance the linearized yaw rate estimation to define the desired vehicle trajectory. The yaw rate model can be used to minimize the potential for a false activation of the stability control system, as compared to a conventional stability control system. Another example of such a modification is to implement the sideslip Beta estimation, as discussed above. The cornering stiffness parameter adaptation may be used with the sideslip estimation. The vehicle sideslip may also used to calculate the wheel slip angle. For example, this calculation may be used to detect a lane change and adapt the stability control appropriately.

The installation of different types of tires may result in significant changes that affect a vehicle stability control system. In one embodiment of the present invention, static tire data is communicated from an ID tag to an electronic control unit. The static tire data may be utilized to modify the control of stability control subsystems. The modification to stability control may include some dynamic parameter value calculations such as a wheel speed or a vehicle speed estimation, a yaw rate modeling for stability control activation, and a vehicle sideslip estimation. Additionally, wheel inertia properties may also be used as a parameter to affect the stability control system modification. For example, as the value of a tire size increases, the system may calculate the increased inertia as more of a factor in determining how the stability control system accounts for the increased tire size. In particular, the rotational inertia of the tire size may affect the wheel inertia (rim and tire) calculation. Using this tire information can result in improved stability control as compared to the previous stability control methodology, in which the system model assumed one nominal tire size and construction for programming the response of the electronic stability control system. The stability control of a preferred embodiment of the present invention provides for consistent stability performance, through tire changes, without compromising the desired performance that might occur due to a tire change. Thus, the stability control system can be modified to account for a variety of changes in static tire characteristics. Note that it is anticipated that if a vehicle is provided with a spare tire of a different size than the other tires of the vehicle (for example, a so-called "space saver" tire) when the spare is installed in place of another tire, preferably the electronic stability control system of an embodiment of the present invention will read the ID tag of the spare tire, note that a change in tire characteristics has occurred, and automatically change the control response to sensor data to account for the change in tire characteristics without any other actions required on the part of the driver of the vehicle. Note that the vehicle may have to be driven a short distance to rotate the newly installed tire or tires to positions where their ID tags can be read.

While the ID tag on the tire has been described above as preferably being an RFID tag, it should be understood that any suitable type of ID tag may be used. For example, it is also contemplated that the ID tag may be an optical tag, such as a bar code, and the information on the ID tag on the tire may be scanned by an optical bar code reader. It is also to be understood that while the data from the ID tag on the tire has been described as being transmitted to the electronic stability control system automatically, either directly or through a transceiver such as the second mechanism (relay) 44, data from the ID tags on tires may be transferred otherwise. For example, if the ID tag is a bar code, a bar code reader could be connected to the vehicle (either permanently or temporarily during servicing) and the data from the bar code could be transferred to electronic stability control system, along with an installation location information so that the programming can be changed when a new tire is installed on the vehicle. Indeed, it is also anticipated that the ID tag could provided in the form of plain text information molded into the tire, which is provided to the electronic stability control system by typing the information in using a keyboard or similar interface device to allow a driver or serviceman to transfer this information, along with tire installation location information, to the electronic stability control system when the tire is installed.

While the principles and modes of operation of this invention have been explained and illustrated with regards to particular embodiments, it must be understood, however, that this invention may be practiced otherwise than as specifically explained and illustrated without departing from its spirit or scope.

What is claimed is:

1. A system for controlling the stability of a vehicle comprising:
a vehicle stability control subsystem including components of the vehicle that affect stability of the vehicle during operation;
a tire having an ID tag containing cornering stiffness data of said tire; and
an electronic control unit coupled in communication with said ID tag to receive the data contained in said ID tag, said electronic control unit being programmed to calculate at least one of a wheel speed, a vehicle speed, a yaw rate and a sideslip based at least in part as a function of said cornering stiffness data from said ID tag, said electronic control unit being programmed to control said vehicle stability control subsystem based at least in part upon the calculation(s) made by said electronic control unit based upon the data received by said electronic control unit from said ID tag, said vehicle stability control subsystem selected from the group consisting of the torque of a powertrain of the vehicle, the apply force of a braking component of the vehicle, a steering angle controlled by steering actuators, and a condition of a component of the vehicle suspension system.

2. The system of claim 1 wherein the electronic control unit is programmed to utilize at least one of the equations:

$$WS = rev/th \times th/lp \times lp/ms = rev/ms;$$

$$WS_1 = rev/ms \times 1000 \, ms/s \times 2\pi R = m/s;$$

$$V = \Sigma WS_1 / WN;$$

$$R\_lin = \frac{V}{L \cdot \left(1 + \frac{V^2}{V_{char}^2}\right)} \delta; \text{ and}$$

$$\dot{\beta} = \left(\frac{C_{af} + C_{ar}}{MV}\right) \cdot \beta + \left(\frac{aC_{af} - bC_{ar} - mV^2}{MV^2}\right) \cdot r + \left(\frac{-C_{af}}{MV}\right) \cdot \delta$$

wherein:
WS is a wheel speed in rev/ms;
rev is revolutions;
th is the number of teeth on a tone wheel;
lp is the number of processing loops;
ms is milliseconds;
$WS_1$ is a wheel speed in m/s;
s is seconds
m is meters
R is a static rolling radius of a tire associated with a wheel in meters;
V is a vehicle speed in meters per second;
$\Sigma WS_1$ is a sum of wheel speeds for a plurality wheels;
WN is the total number of wheels included in the plurality of wheels;
R_lin is a vehicle yaw rate;
L is the distance between front and rear tires;
$V_{char}$ is a value of vehicle characteristic calculated from values of normal load and tire cornering stiffness;
δ is a steering angle;
$\dot{\beta}$ is a rate of change of sideslip;
$C_{af}$ is cornering stiffness-front tire;
$C_{ar}$ is cornering stiffness-rear tire;
M is vehicle mass;
β is a value of sideslip;
a is the distance between the front axle and the center of gravity;
b is the distance between the rear axle and the center of gravity; and
r is a yaw rate.

3. The system of claim 1 further comprising at least one sensor configured to detect at least one vehicle condition, wherein said electronic control unit is coupled in communication with said sensor to receive data representative of the vehicle condition detected by said sensor, said electronic control unit being programmed to control said vehicle stability control subsystem based at least in part upon the data received by said electronic control unit from said sensor.

4. The system of claim 3 wherein the vehicle condition is one of a steering wheel angle, a vehicle yaw rate, a longitudinal vehicle acceleration, a lateral vehicle acceleration, a wheel speed, and a vehicle speed.

5. The system of claim 1 further comprising a mechanism to transmit the sensor data to said electronic control unit controller.

6. The system of claim 1 wherein said electronic control unit controls said vehicle stability control subsystem by generating an output signal, said vehicle stability control subsystem responsive to the output signal.

7. The system of claim 1 wherein said ID tag is an RFID tag.

8. The system of claim 7 wherein said RFID tag is a passive RFID tag.

9. A system for controlling the stability of a vehicle comprising:
a vehicle stability control subsystem including components of the vehicle that affect stability of the vehicle during operation;
a tire having an ID tag containing static rolling radius and cornering stiffness data of said tire; and
an electronic control unit coupled in communication with said ID tag to receive the data contained in said ID tag, said electronic control unit being programmed to calculate at least one of a wheel speed, a vehicle speed, a yaw rate and a sideslip based at least in part as a function of said static rolling radius and said cornering stiffness data from said ID tag, said electronic control unit being programmed to control said vehicle stability control subsystem based at least in part upon the calculation(s) made by said electronic control unit based upon the data received by said electronic control unit from said ID tag, said vehicle stability control subsystem selected from the group consisting of the torque of a powertrain of the vehicle, the apply force of a braking component of the vehicle, a steering angle controlled by steering actuators, and a condition of a component of the vehicle suspension system.

* * * * *